US009266350B2

(12) United States Patent
Lazzari et al.

(10) Patent No.: US 9,266,350 B2
(45) **Date of Patent: *Feb. 23, 2016**

(54) METHOD OF FORMING A COLOR LASER IMAGE OBSERVABLE WITH VARIABLE COLORS, AND A DOCUMENT ON WHICH SUCH A COLOR LASER IMAGE IS MADE IN THIS WAY

(71) Applicants: Jean Pierre Lazzari, Sainte Maxime (FR); Jean Marc Lazzari, Montfort l'Amaury (FR)

(72) Inventors: Jean Pierre Lazzari, Sainte Maxime (FR); Jean Marc Lazzari, Montfort l'Amaury (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/380,336

(22) PCT Filed: Feb. 19, 2013

(86) PCT No.: PCT/FR2013/050333

§ 371 (c)(1),
(2) Date: Aug. 21, 2014

(87) PCT Pub. No.: WO2013/124575

PCT Pub. Date: Aug. 29, 2013

(65) Prior Publication Data

US 2015/0024174 A1 Jan. 22, 2015

(30) Foreign Application Priority Data

Feb. 22, 2012 (FR) ..................................... 12 00511

(51) Int. Cl.

*B32B 3/00* (2006.01)
*B41J 2/455* (2006.01)
*B41M 3/14* (2006.01)

(Continued)

(52) U.S. Cl.

CPC ................ *B41J 2/455* (2013.01); *B41M 3/148* (2013.01); *B41M 5/267* (2013.01); *B41M 5/34* (2013.01); *Y10T 428/24802* (2015.01)

(58) Field of Classification Search

CPC .. Y10T 428/24802; B41M 5/34; B41M 3/148
See application file for complete search history.

(56) References Cited

U.S. PATENT DOCUMENTS

| | | | |
|---|---|---|---|
| 5,350,198 | A | 9/1994 | Bernecker |
| 5,364,829 | A | 11/1994 | Kishimoto et al. |
| 5,932,318 | A | 8/1999 | Uchiyama |

(Continued)

FOREIGN PATENT DOCUMENTS

| | | |
|---|---|---|
| CA | 1 019 012 | 10/1977 |
| FR | 2 958 777 | 10/2011 |

(Continued)

OTHER PUBLICATIONS

International Search Report dated Jun. 14, 2013 from International Application No. PCT/FR2013/050333 filed Feb. 19, 2013, pp. 1-4.

(Continued)

*Primary Examiner* — Elizabeth Mulvaney
(74) *Attorney, Agent, or Firm* — MH2 Technology Law Group, LLP

(57) ABSTRACT

The present invention relates to forming color laser images that are observable with variable colors. The gray levels are produced by non-reflective, black volumes in a laserable layer that mask the adjacent subpixels and that cause variable colors to appear depending on the angle of observation of the document. The invention is applicable to official documents.

6 Claims, 2 Drawing Sheets

(51) Int. Cl.
*B41M 5/26* (2006.01)
*B41M 5/34* (2006.01)

(56) References Cited

U.S. PATENT DOCUMENTS

| | | | |
|---|---|---|---|
| 6,633,321 | B1 | 10/2003 | Maurer |
| 2003/0011868 | A1 | 1/2003 | Zehner et al. |
| 2003/0136847 | A1 | 7/2003 | Braun et al. |
| 2005/0240549 | A1 | 10/2005 | Adamczyk et al. |

FOREIGN PATENT DOCUMENTS

| | | | |
|---|---|---|---|
| FR | 2 971 972 | | 8/2012 |
| FR | 2 984 217 | | 6/2013 |
| WO | 97/17211 | | 5/1997 |
| WO | 2008/139045 | A1 | 11/2008 |
| WO | 2011/045180 | | 4/2011 |
| WO | 2011/124774 | A1 | 10/2011 |
| WO | 2012/117168 | | 9/2012 |

OTHER PUBLICATIONS

International Search Report and Written Opinion dated Jun. 12, 2012 for International Application No. PCT/FR2012/000081 filed Mar. 8, 2012, pp. 1-8.

Auth. Officer Blaise Dardel. International Search Report dated Feb. 28, 2013 from International Application No. PCT/FR2012/000501 filed Dec. 5, 2012, pp. 1-9.

METHOD OF FORMING A COLOR LASER IMAGE OBSERVABLE WITH VARIABLE COLORS, AND A DOCUMENT ON WHICH SUCH A COLOR LASER IMAGE IS MADE IN THIS WAY

CROSS-REFERENCE TO RELATED APPLICATIONS

This application is a U.S. National Stage application of PCT/FR2013/050333 filed 19 Feb. 2013, which claims priority to French Application No. 1200511 filed 22 Feb. 2012, the entire disclosures of which are hereby incorporated by reference in their entireties.

FIELD OF APPLICATION OF THE INVENTION

The present invention relates to forming color-laser images observable with variable colors. The invention finds applications in particular in personalizing identity images dedicated to official documents: identity cards, credit cards, health insurance cards, passports, drivers' licenses, secure entry badges, etc.

The present invention, serves in particular to enable the authenticity of the color laser image to be checked immediately and simply.

STATE OF THE PRIOR ART

French patent No. FR 10/01415 entitled "Dispositif de personnalisation d'images latentes encastrées" [A device for personalizing embedded latent images] filed on Apr. 7, 2010 describes a structure comprising a matrix of pixels made up of subpixels in primary colors, and embedded under a transparent protective layer. A laser beam carbonizes the surfaces of subpixels, creating non-reflective, black surfaces that form the gray levels of the personalized image. That patent thus enables a latent image to be personalized, which latent image is constituted by subpixels. The gray levels produced by laser carbonization form a personalized image that is very secure since it cannot be deleted. French patent application No. 11/00578 of Feb. 28, 2011, entitled "Procédé de formation d'une image laser couleur document haut rendement réflectif et document sur lequel une image laser couleur et gris par carbonisation" [A method of forming a highly reflective color laser image, and a document on which a color laser is made in this way] proposes forming gray levels by laser carbonization in the protective layer protecting the matrix of subpixels, while improving overall reflectivity. That treatment makes it possible to obtain better quality personalization of a color image. French patent application No. 11/03319 filed on Dec. 19, 2011, and entitled "Precédé de formation d'images laser couleur et document ainsi réalisé" [A method of forming color laser images, and a document made thereby] proposes a matrix of subpixels, which matrix is protected by a transparent protective layer. Under the matrix of subpixels, there is a layer that is sensitive to laser radiation. The gray levels of the personalized image are formed in this layer under the matrix of subpixels by the effect of laser radiation.

In those three prior art descriptions, the color laser image is observed by reflection through the transparent protective layer. Those personalized images are obtained by interaction between the subpixels and non-reflective, black surfaces produced by laser carbonization that serves to form the gray levels of the final personalized image.

Patent US 2003/0136847 entitled "Method for producing laser-writable data carriers and data carrier produced according to this method" and commercially available under the acronym LPI (laser protected image) from the supplier Giesecke & Devrient, proposes a color image printed by conventional methods, and in particular by thermal transfer. That color image does not have its black or gray components. The black or gray components are provided through the printed color image in the layer sensitive to laser radiation, which layer is situated under the surface of the printed image. The final image is thus a combination of two partial versions of the same image, one that is printed and comprises its colors, and the other being black and white for completing the color image and obtained by laser carbonization. Thus, even if the color image were to be deleted, the black and white laser image would not be altered.

Although advantageous in certain respects, that first group of prior art references seeking to produce color images with the help of a laser does not enable images to be made that are observable with variable colors.

a second group of prior art references is described in patents CA 1 019 012 of 1977, WO 97/17211, and US 2005/0240549, which propose structures in relief made on the plane of the protective layer in the form of lenses or of sloping planes. Depending on the angle of incidence with which the document is observed, the incident light is deflected by the surface structures, thereby enabling different patterns to be viewed under the surface structures.

Although advantageous in certain respects, that second prior art group requires a specific structure in relief that is complex and expensive to fabricate, since the structure must be accurately aligned relative to the underlying patterns. Furthermore, those methods do not enable a color laser image to be personalized with variable colors.

SUMMARY OF THE INVENTION

An object of the present invention is to remedy the drawbacks of the prior art by proposing a method of forming a color laser image that is observable with variable colors, and a document having a color laser image made thereon in this way.

For this purpose, the invention proposes a matrix of color subpixels, a "laserable" layer that is sensitive to laser radiation, and that serves to form gray levels of a color laser image by being carbonized in association with the subpixels. Volumes that have been blackened by carbonization (to form the gray levels), mask the pixels that are in register with those volumes when the image is observed perpendicularly to its plane, and they also mask adjacent pixels when the image is observed under angles of incidence, thereby causing variable colors to appear in the personalized image. The term "laserable" material is used below to designate any material that becomes blackened under the effect of a laser beam.

More precisely, the invention provides a method of forming a color laser image that is observable with variable colors, from an assembly comprising a protective layer, pixels made up of color subpixels, and a laserable layer, the assembly being laminated on a reflective white medium. The sheet of laserable material is then carbonized in part by the effect of a laser beam in order to form non-reflective, black volumes in association with the subpixels in order to produce gray levels of a personalized color laser image when the image is observed perpendicularly to its plane. When the personalized color laser image is observed under various angles of incidence, the non-reflective, black volumes mask adjacent subpixels, thereby causing changing colors in the personalized image to appear to the observer.

As non-limiting examples, laserable materials include polycarbonates, certain treated polyvinyl chlorides (PVCs), treated acrylonitrile-butadeiene-styrenes (ABSs), and treated polyethylene terephthalates (PETs). The laserable material is carbonized in part, by the laser in order to form gray levels of a personalized image.

The degree of blackening is made proportional to the energy delivered by the laser, with the help of linearizing software known to the person skilled in the art.

The transparent layer of laserable material may advantageously present thickness lying in the range 20 micrometers (μm) to 500 μm. Sensitivity to laser radiation is obtained by doping in a manner known to the person skilled in the art. The layer of laserable material may be situated over the matrix of subpixels, or under it. The subpixels are printed by offset printing, by ink-jet printing, or by any other technique. The subpixels are organized in parallel columns, or in small uniformly distributed areas.

In the second fabrication step, referred to as "laminating", the assembly comprising the protective layer, the subpixel matrix, and the layer of laserable material is hot-bonded under pressure on the document medium. This bonding operation is known as "lamination" by the person skilled in the art.

The image of the invention is then personalized with the help of a laser beam that carbonizes a certain thickness of the sheet of laserable material with varying intensities or areas over each subpixel so as to form non-reflective, black volumes that cause gray levels to appear in the final personalized image. Ambient light passing through the protective layer, the matrix of subpixels, and the laserable layer including the gray levels, is reflected on the substantially white background of the medium. The personalized image thus appears in its own colors to an observer when it is observed substantially perpendicularly to its plane. When the observer inclines the plane of the document, ambient light passes through the protective sheet, the subpixels, and the layer of laserable materials, and it is reflected on the substantially white background of the document medium, at an angle of incidence, thereby having the effect of causing adjacent subpixels to be masked, so as to cause changing colors to appear in the personalized, laser color image.

In particular implementations:

- the subpixels are printed on the substantially white document body, the laserable layer covers the subpixels and the protective layer, which are laminated on the document body;
- the laserable layer is deposited on the document body or is made by doping the surface of the document body. The subpixels are printed on the laserable layer, and covered by the protective layer, the assembly being laminated on the document body.

In a variant of the invention, the color laser image causes predetermined changing colors to appear, and it is separate from a color laser image having colors that do not change.

The invention also provides a document including a laser image made by performing the above method. The document comprises an assembly constituted by a protective layer, pixels made up of color subpixels, and a laserable layer, the assembly being laminated on a medium. The layer of laserable material is then carbonized in part by the effect of a laser beam in order to form non-reflective, black volumes in association with the subpixels so as to produce gray levels of a personalized color laser image when the image is observed perpendicularly to its plane. When the personalized color laser image is observed under various angles of incidence, the non-reflective, black volumes mask adjacent subpixels and cause changing colors to appear to the observer in the personalized image.

In particular embodiments:

- the subpixels are printed on the substantially white document body, the laserable layer covers the subpixels and the protective layer, which are laminated onto the document body;
- the laserable layer is deposited on the document body or is made by surface doping the document body. The subpixels are printed on the laserable layer and covered by the protective layer, the assembly being laminated on the document body.

In a variant of the invention, the color laser image causes predetermined changing colors to appear and is separate from a color laser image having colors that are not variable.

DESCRIPTION OF THE FIGURES

The invention appears more clearly from the following description given by way of non-limiting explanation. The description refers to the accompanying drawings, in which.

DETAILED DESCRIPTION

Figure 1A:
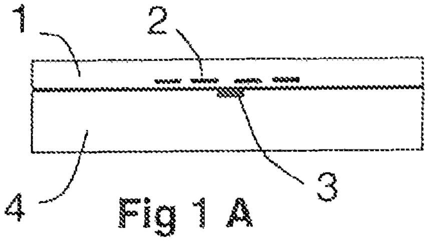
FIG. 1A is a section view of a document in the first prior art group.

FIG. 1A is a section of a document in the first group of the prior art. The subpixels (2) are covered by a protective layer (1). The subpixels and the protective layer are laminated on the card body (4). The non-reflecting black surfaces (3) form the gray levels of the personalized image beneath the subpixels (2).

Figure 1B:
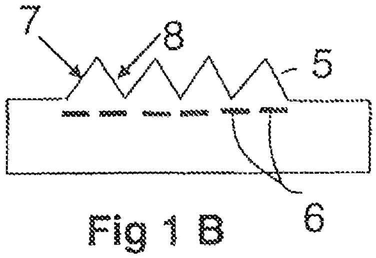
FIG. 1B is a section view of a document in the second prior art group.

FIG. 1B is a section of a document in the second group of the prior art. The surface of the document includes structures (5) in relief that deflect, incident light (7) or (8), thus making it possible to view different groups of patterns (6) situated under the structures in relief. The structures in relief may be sloping planes, or cylindrical lenses. It is essential for these structures (5) to be in alignment relative to the patterns (6) in order to produce the looked-for effect.

Figure 2:
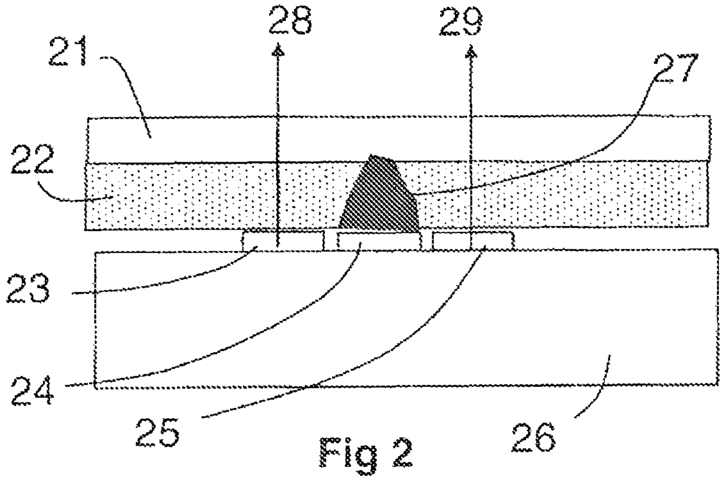
FIG. 2 is a section in a first embodiment of the invention, when the document, is observed perpendicularly to its plane.

FIG. 2 is a section of a document in a first embodiment of the invention. Subpixels (23), (24), (25) are printed on the reflective, white body (26) of the document. They are covered by the laserable layer (22), which is itself covered by the protective layer (21). The laserable layer (22) may be obtained by surface doping of the protective layer (21) so as to make it sensitive to laser radiation. The protective layer, and the laserable layer are laminated onto the document body (26). During personalization, a laser beam carbonizes the laserable layer in its thickness, thereby forming non-reflective black volumes (27) situated in register with certain subpixels, so as to form the gray levels of the personalized image. The energy delivered by the laser is adjusted so as to produce all of the shades of gray required to form an attractive color laser image.

When the document is observed perpendicularly to its plane, the reflected light beams (28) and (29) take on the colors of respective subpixels (23) and (25). If the non-reflective, black volume (27) does not cover a subpixel (24) completely, then some of the color of that subpixel can be seen by the observer.

Figure 3:
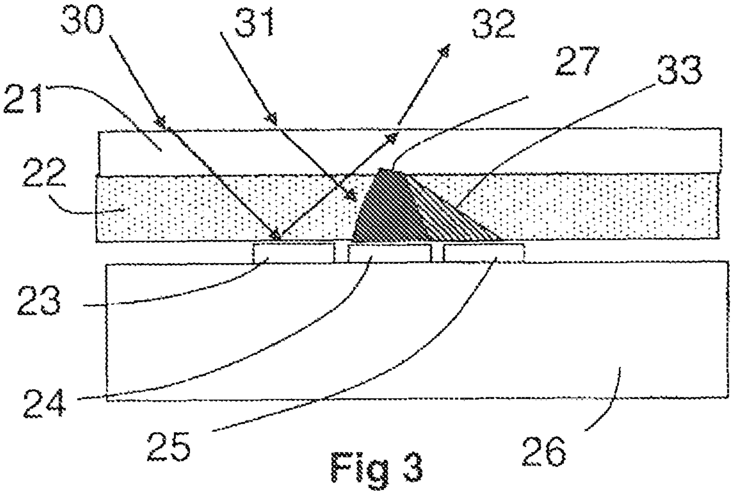
FIG. 3 is a section of a document in a first embodiment of the invention, when the document is observed at an angle of incidence.

FIG. 3 is a section of the same document when observed with light at an angle of incidence. It shows the document body (26), the subpixels (23), (24), (25) the laserable layer (22), the protective layer (21) and the non-reflective, black volume (27). The incident light beam (30) illuminates the subpixel (23), is reflected on the white surface of the document, and leaves it colored with the color of the subpixel (23). The incident light beam (31) encounters the non-effective, black volume (27) and is absorbed thereby. A shadow zone (33) is thus formed that masks the subpixel (25) when the document is observed at the angle of incidence of the light beams (30) and (31). The observer then sees the color of the subpixel (23) which differs from that of the combination of the colors of the subpixels (23) and (25), as shown in FIG. 2.

Figure 4:
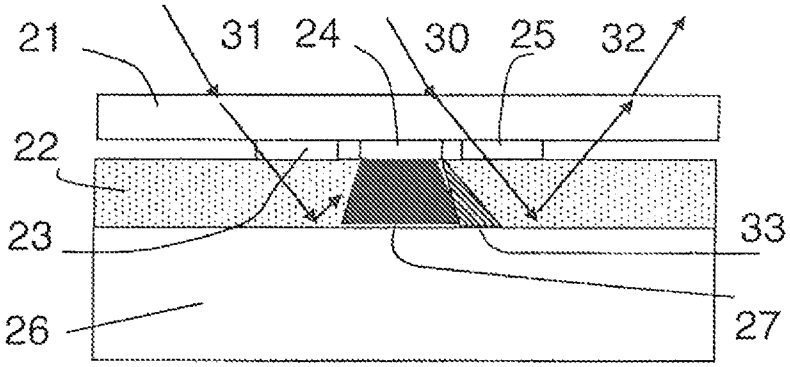
FIG. 4 is a section view of a document in a second embodiment of the invention.

FIG. 4 is a section of a document in a second embodiment of the invention. The document white body (26) is doped on its surface so as to be sensitive to laser radiation, forming a laserable layer (22). In a variant, the laserable layer (22) is applied on the card body (26). The subpixels (23), (24), and (25) are printed on the surface of the laserable layer (22), and they are covered by the transparent protective layer (21). Personalization is performed by the laser beam which passes through the protective layer and the subpixels and forms non-reflective black volumes (27) that constitute the gray levels of the personalized image.

An observer looking at the document at an angle of incidence (31) and (30) can hardly see the color of the subpixel (23). The light beam that passes through it is reflected on the white surface of the body (26) and is then absorbed by the non-reflective black volume (27). Only a very small fraction of the light, is reflected by the surfaces of the subpixels (23), (24), and (25). The observer sees practically only the color of the subpixel (25). A shadow zone (33) is formed on the other side of the non-reflective, black volume (27) relative to the incident light beams (30) and (31).

The invention claimed is:

1. A method of forming a color laser image that is observable with varying colors, from an assembly comprising a protective layer protecting pixels comprising color subpixels and a laserable layer, the assembly being laminated on a reflective white medium, the method comprising:

carbonizing the laserable layer in part by the effect of a laser beam in order to form non-reflective, black volumes in association with the color subpixels in order to produce gray levels of a personalized color laser image when the personalized color laser image is observed perpendicularly to its plane, and when the personalized color laser image is observed under various angles of incidence, the non-reflective, black volumes mask adjacent subpixels, thereby causing changing colors in the personalized color laser image to appear to an observer.

2. A method according to claim 1 for forming a color laser image that is observable in varying colors, wherein the non-reflective, black volumes are formed over the color subpixels.

3. A method according to claim 1 for forming a color laser image that is observable in varying colors, wherein the non-reflective, black volumes are formed under the color subpixels.

4. A method according to claim 1 for forming a color laser image observable in varying odors, wherein the varying colors are predetermined, and wherein the personalized color laser image observable with the varying colors is separate from a color laser image having colors that are not variable.

5. A document including a color laser image that is observable with variable colors, made by implementing the method according to any preceding claim, the document comprising:

an assembly comprising a protective layer, pixels made up of color sub pixels, and a laserable layer, wherein the laserable layer is carbonized in part by the effect of a laser beam in order to form non-reflective, black volumes in association with the color subpixels so as to produce gray levels of a personalized color laser image when observed perpendicularly to the plane of the document, and when the personalized color laser image is observed under varying angles of incidence, the non-reflective, black volumes mask adjacent subpixels, causing changing colors in the personalized color laser image to appear to an observer;

wherein a document body and the assembly comprising the protective layer, the laserable layer, and the pixels made up of color subpixels are suitable for being laminated together.

6. A document according to claim 5 including a color laser image that is observable with variable colors, wherein the variable colors are predetermined, and wherein the personalized color laser image observable with the variable colors is separate from a color laser image having colors that are not variable.

* * * * *